United States Patent [19]
Akimoto et al.

[11] Patent Number: 5,785,031
[45] Date of Patent: Jul. 28, 1998

[54] COMBUSTION CONTROL SYSTEM FOR IN-CYLINDER FUEL INJECTION ENGINE AND THE METHOD THEREOF

[75] Inventors: Akira Akimoto, Masashino; Fujio Takimoto, Ichikawa, both of Japan

[73] Assignee: Fuji Jukogyo Kabushiki Kaisha, Tokyo, Japan

[21] Appl. No.: 880,017

[22] Filed: Jun. 20, 1997

[30] Foreign Application Priority Data

Jul. 15, 1996  [JP]  Japan ................. 8-184770

[51] Int. Cl.$^6$ ............... F02B 17/00; F02D 41/06; F02M 45/00
[52] U.S. Cl. ........................... 123/295; 123/305
[58] Field of Search ................ 123/295, 305, 123/430, 491

[56] References Cited

U.S. PATENT DOCUMENTS

| | | | |
|---|---|---|---|
| 4,784,098 | 11/1988 | Artman | 123/430 X |
| 5,078,107 | 1/1992 | Morikawa | 123/295 |
| 5,603,301 | 2/1997 | Sakurai et al. | 123/430 |

Primary Examiner—Tony M. Argenbright
Attorney, Agent, or Firm—Martin A. Farber

[57] ABSTRACT

In an in-cylinder fuel injection engine capable of selectively switching a combustion strategy from a stratified charge combustion to a homogeneous charge combustion and vice versa, when a coolant temperature at engine start is lower than a specified temperature, the combustion strategy is established to be a homogeneous charge combustion mode and this homogeneous charge combustion mode is held until the coolant temperature reaches the specified temperature. While the coolant temperature is higher than the specified temperature and lower than a warm-up completion temperature, the combustion strategy is switched from homogeneous to stratified by lowering the engine load from a high load area to a low load area so as to improve emissions and fuel economy. On the other hand, when the engine is restarted at the coolant temperature higher than the specified temperature, the combustion strategy is established to be homogeneous until the fuel pressure reaches a specified value and is switched from homogeneous to stratified after the fuel pressure reaches the specified value.

6 Claims, 5 Drawing Sheets

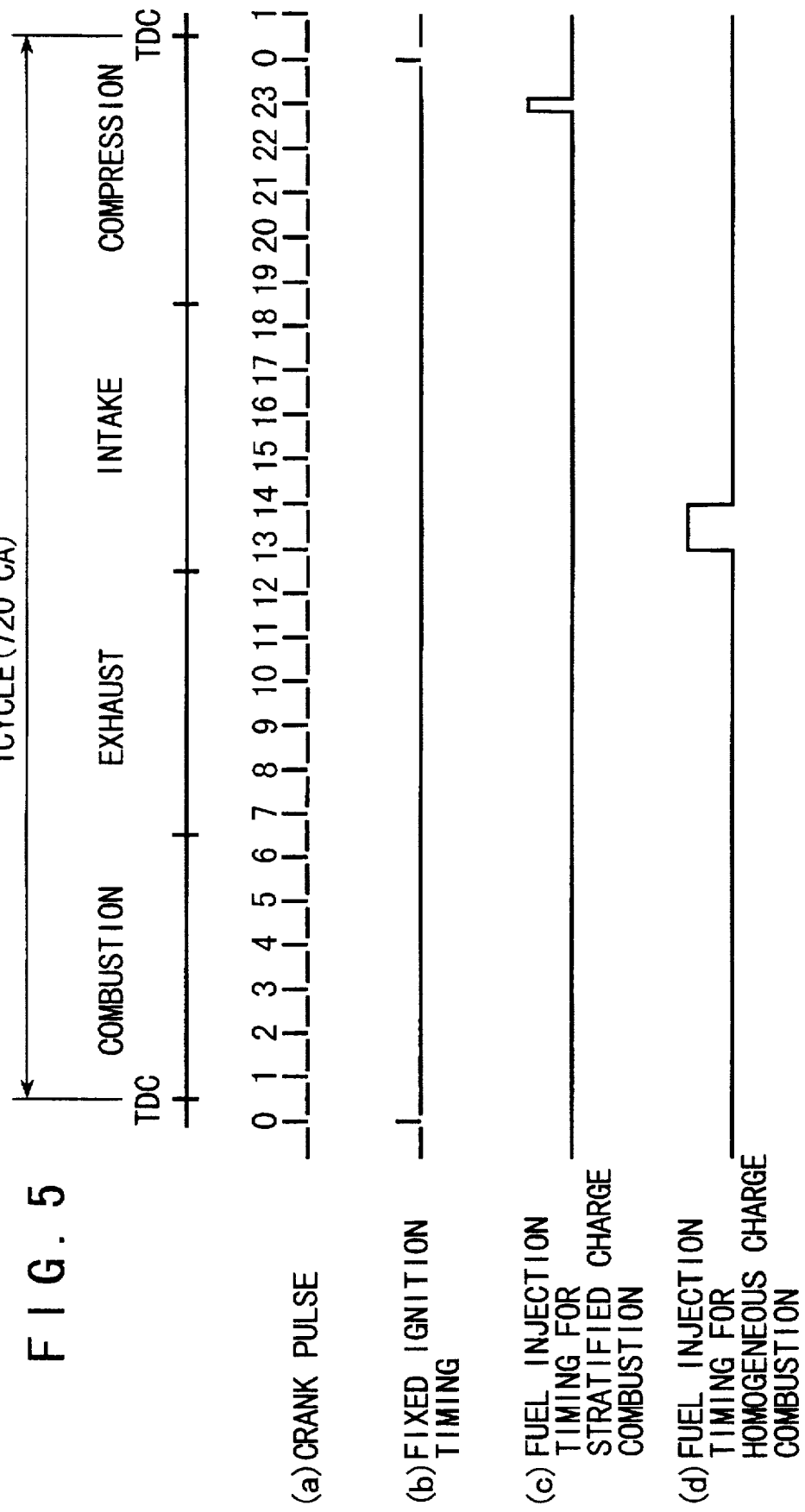

COMBUSTION CONTROL SYSTEM FOR IN-CYLINDER FUEL INJECTION ENGINE AND THE METHOD THEREOF

BACKGROUND OF THE INVENTION

1. Field of the Invention

The present invention relates to a combustion control system and method of an in-cylinder fuel injection engine and more particularly to a combustion control system and method capable of selectively changing the combustion strategy from a stratified charge combustion to a homogeneous charge combustion and vice versa according to engine operating conditions.

2. Prior Art

Generally, the in-cylinder fuel injection engine can be designed so as to selectively change the combustion strategy from a stratified charge combustion to a homogeneous charge combustion and vice versa according to engine operating conditions. The stratified charge combustion is a combustion strategy for enabling a stable combustion even in a lean air-fuel ratio condition by achieving a charge stratification of injected fuel at the latter stage of the compression stroke and for forming ignitable air-fuel mixture gas around the spark plug. The homogeneous charge combustion is a combustion strategy for producing a more power by injecting fuel during the intake stroke and well mixing the fuel with intake air like in case of the port injection.

The applicant of the present invention proposes the construction of a combustion chamber suitable for both combustion strategies, the stratified charge combustion and the homogeneous charge combustion in Japanese Patent Application Laid-open No. Toku-Kai-Hei 6-42352. In this invention, a fuel injector is disposed in a vertical position at the top center of the combustion chamber and a cavity is formed at the top surface of the piston in the counter direction of the injection direction of the fuel injector. Further, an electrode of the spark plug is disposed in the vicinity of the nozzle of the fuel injector.

Further, Japanese Patent Application Laid-open No. Toku-Kai-Hei 2-169834 discloses a technique in which the fuel injection timing is varied according to engine operating conditions. That is, fuel is injected at the latter stage of the compression stroke when the engine is operated at low load. When the engine is operated at intermediate and high load, it is injected separately in two stages, the early stage of the intake stroke and the latter stage of the compression stroke. Fuel injected at the early stage of the intake stroke forms a homogeneous lean mixture needed for flame propagation and fuel injected at the latter stage of the compression stroke forms a relatively rich mixture needed for ignition around the spark plug.

However, these in-cylinder fuel injection engines have the following problems.

1) Ignitability at cold start

In the in-cylinder fuel injection engine according to the prior art, the stratified charge combustion mode is established when the engine starts and when it is operated at low load, respectively. In case of an in-cylinder fuel injection engine whose high pressure fuel pump belongs to an engine driven type, fuel pressure can not be raised high enough immediately after the engine start. Therefore, the droplet size of fuel sprayed from the in-cylinder fuel injector is relatively large, this results in insufficient atomization of the sprayed fuel. In addition, because air and fuel have low temperature at the cold start of the engine, fuel is insufficiently vaporized and as a result ignitable air-fuel mixture can not be formed before it is ignited. Further, additionally, at the cold start of the engine, since the electrode of the spark plug has low temperature, it is difficult to form a stably ignitable air-fuel mixture around the electrode of the spark plug.

2) Combustion after firing completion

In the stratified charge combustion strategy, since ignitable rich air-fuel mixture is formed around the electrode of the spark plug, when the engine is still cold, liquid fuel stuck to the electrode is burned incompletely, which may result in a built-up of soot deposits therearound or fouling of the spark plug. Further, under the stratified charge combustion, it takes time to warm-up the engine due to a small amount of heat acceptance.

In order to solve these problems, for example, Japanese Patent Application Laid-open No. Toku-Kai-Sho 61-250354 discloses a technique wherein two fuel injectors, one for in-cylinder injection and another for port injection are disposed and when the engine temperature is low, like when starting the engine, more fuel is injected from the fuel injector for port injection than from the fuel injector for in-cylinder injection so as to enhance ignitability and combustion, thereby the startability of the engine being improved. Further, after the engine starts, the relative amount of fuel injected from the fuel injector for in-cylinder injection with respect to the amount of fuel injected from the fuel injector for port injection is gradually increased with an increase of the engine temperature, whereby a smooth transfer from the homogeneous charge combustion to the stratified charge combustion is achieved.

However, this prior art also has problems of complicated construction, an increase of the number of components, a cost increase and the like, not only because two fuel injectors are needed but also because two independent fuel systems with a different fuel pressure characteristic are needed.

SUMMARY OF THE INVENTION

With a view to the foregoing situations, it is an object of the present invention to provide a combustion control system for an in-cylinder fuel injection engine having a simple construction and a low cost and it is a further object to provide a combustion control system having a good cold startability and a combustion stability after cold start. It is another object to provide a combustion control system capable of improving a fuel economy and emissions performance.

In order to achieve the objects, the combustion control system according to a first aspect of the present invention comprises:

stratified combustion area establishing means for establishing a stratified combustion area where a stratified charge combustion is performed in an overall engine operating area of the engine;

homogeneous charge combustion establishing means for establishing the combustion strategy at starting the engine to be a homogeneous charge combustion mode when engine temperature is lower than a predetermined temperature and for holding the homogeneous charge combustion mode until the engine operating condition returns to the stratified combustion area again; and stratified charge combustion establishing means for establishing the combustion strategy during engine warm-up to be a stratified charge combustion mode when engine temperature is equal to or larger than the predetermined temperature and at least when the engine operating condition returns to the stratified combustion area and for establishing the combustion strategy after warming-up to be the stratified charge combustion mode when the engine operating condition stays in the stratified combustion area.

Further, the combustion control system according to a second aspect of the present invention comprises:

stratified charge combustion establishing means for establishing the combustion strategy at starting the engine to be a stratified charge combustion mode when engine temperature at starting the engine is equal to or larger than a predetermined temperature and when fuel pressure applied to the fuel injector is equal to or larger than a predetermined value; and combustion strategy establishing means for establishing the combustion strategy after starting the engine based on the engine operating condition.

Furthermore, the combustion control system according to a third aspect of the present invention comprises:

homogeneous charge combustion establishing means for establishing the combustion strategy at starting the engine to be a homogeneous charge combustion mode when engine temperature at starting the engine is equal to or larger than a predetermined temperature and when fuel pressure applied to the fuel injector is smaller than a predetermined value.

BRIEF DESCRIPTION OF THE DRAWINGS

Preferred embodiments will be described with reference to accompanying drawings in which:

FIG. 5 is a time chart of primary signals for the engine operation, such as crank pulses, an ignition timing, a fuel injection timing for stratified charge combustion and a fuel injection timing for homogeneous charge combustion.

DETAILED DESCRIPTION OF PREFERRED EMBODIMENTS

Figure 3:
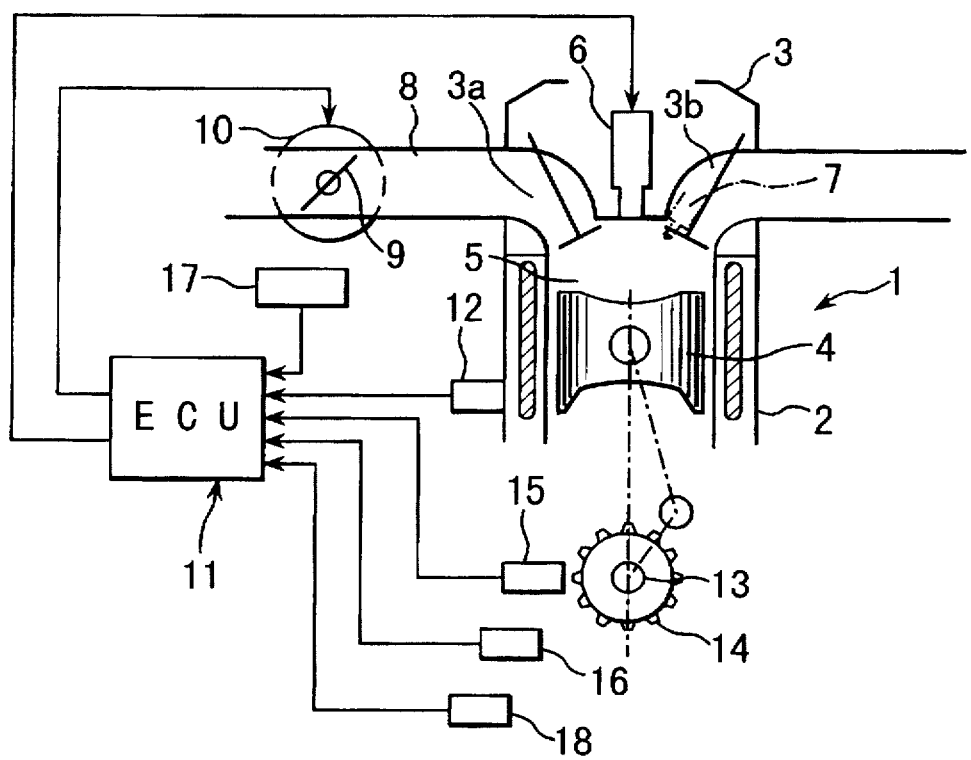
FIG. 3 is a schematic view of an engine according to the present invention.

Referring now to FIG. 3, numeral 1 denotes an engine and numeral 5 denotes a combustion chamber. The combustion chamber 5 is constituted by a cylinder block 2, a cylinder head 3 and a piston 4. Further, a fuel injector 6 for in-cylinder injection is provided in the cylinder head 3 with its injection nozzle projected from the top center of the combustion chamber and a spark plug 7 is disposed in the cylinder head 3 with its electrodes adjacent to the fuel injector nozzle.

Further, in the cylinder head 3 there are provided an intake port 3a and an exhaust port 3b, respectively. The intake port 3a is connected with an intake passage 8 having a throttle valve 9. The throttle valve 9 is connected with a throttle actuator 10 such as an electric motor or a hydraulic motor without a mechanical connection with the accelerator pedal.

The fuel injector 6 is connected with a fuel line (not shown) whose fuel pressure is raised by an engine driven type high pressure fuel pump (not shown) and regulated by a high pressure regulator.

The width of fuel injection pulse of the fuel injector 6 and the rotation angle of the throttle actuator 10 are controlled by an electronic control unit (ECU) 11, respectively. The electronic control unit 11 is composed of a micro-computer and its input terminals are connected with miscellaneous sensors such as a coolant temperature sensor 12 for detecting a coolant temperature $T_W$ representing engine temperature, a crank angle sensor 15 for detecting crank pulses by projections formed on the outer periphery of a crank rotor 14 coaxially connected with a crank shaft 13, an accelerator opening sensor 16 for detecting an accelerator depressing angle, and a fuel pressure sensor 17 for detecting a fuel pressure $P_{FU}$ to be applied to the fuel injector 6 and switches such as a starter switch 18 and the like. Its output terminals are connected with miscellaneous actuators such as the fuel injector 6, the throttle actuator 10 and the like and an igniter (not shown) for outputting an ignition signal to the spark plug 7.

On the outer periphery of the crank rotor 14, there are provided with 12 projections at regular intervals according to the embodiment of the present invention and the first projection before top dead center (BTDC) corresponds to a fixed ignition pulse BTDC 10 degrees CA, as shown in FIG. 5.

The fuel injection timing is variablly established according to the combustion strategy (a homogeneous charge combustion mode or a stratified charge combustion mode) which is selected based on the engine operating condition. That is to say, the homogeneous charge combustion mode is a combustion mode selected in an intermediate or high load condition of the engine, in which fuel starts to be injected at the early stage of the intake stroke and an air-fuel mixture mixed well in the cylinder is ignited and the stratified charge combustion mode is a combustion mode selected in a low load condition of the engine, in which fuel finishes to be injected immediately before ignition and a rich air-fuel mixture formed by the end portion of injected fuel is ignited. In the stratified charge combustion, since only air around fuel is used for combustion, a stable combustion can be obtained with quite a small amount of fuel compared to charged air. Further, the stratified charge combustion enables a combustion over the wide range of air-fuel ratio. Furthermore, the stratified charge combustion can improve fuel economy because the stratified charge combustion with lean air-fuel ratio provides the engine with a reduction of the pumping loss and the cooling loss. On the other hand, in order to obtain a smooth transference from the homogeneous charge combustion to the stratified charge combustion, it is necessary to switch the combustion strategy under the condition of the same amount of air and the same air-fuel ratio at a specified engine load. Therefore, in the stratified charge combustion according to the present invention, the engine load is controlled by changing the amount of fuel injection with the approximately constant amount of air at the same engine speed.

Figure 1:
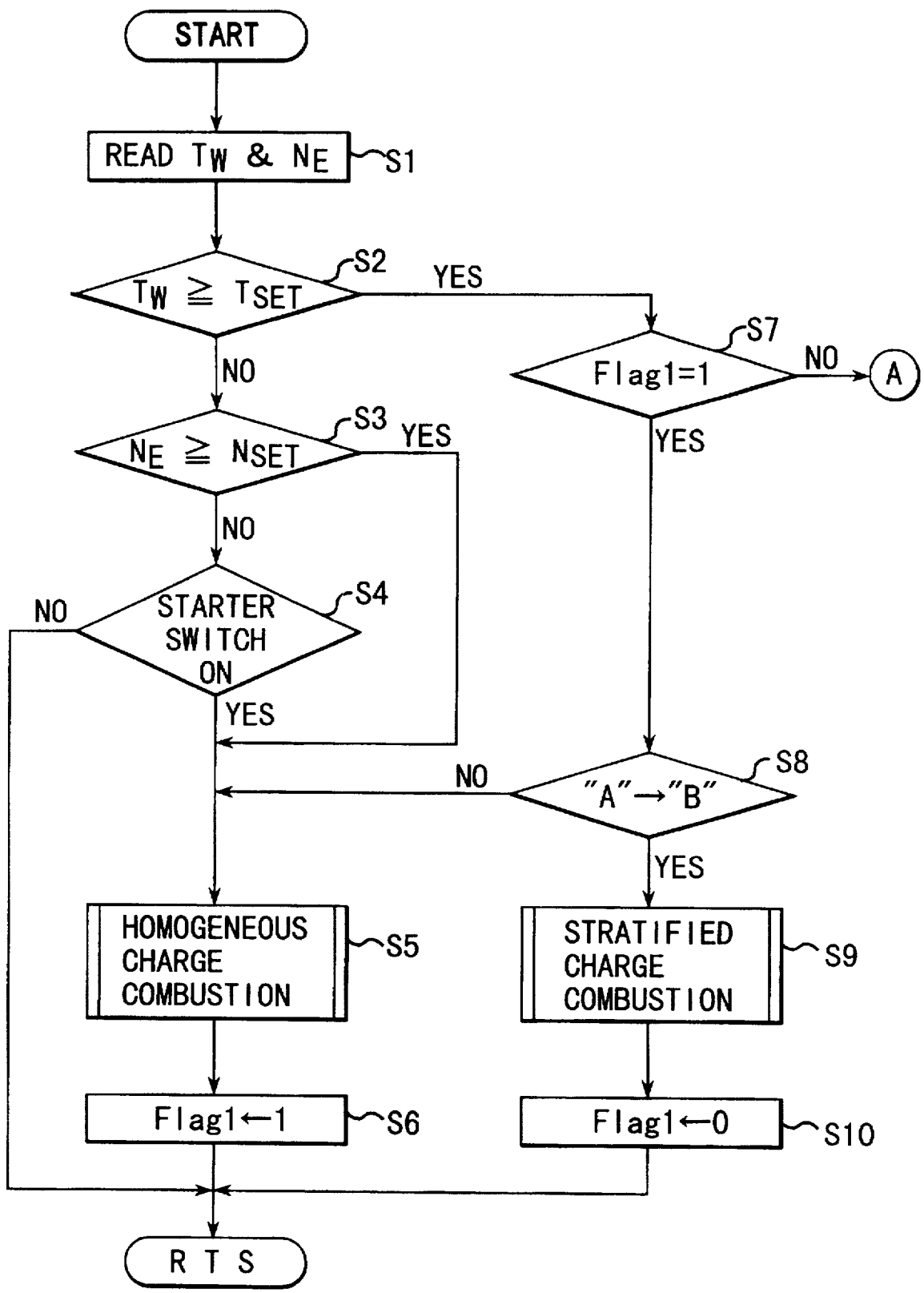
FIG. 1 is a flowchart showing a control routine of a combustion strategy according to the present invention.
Figure 2:
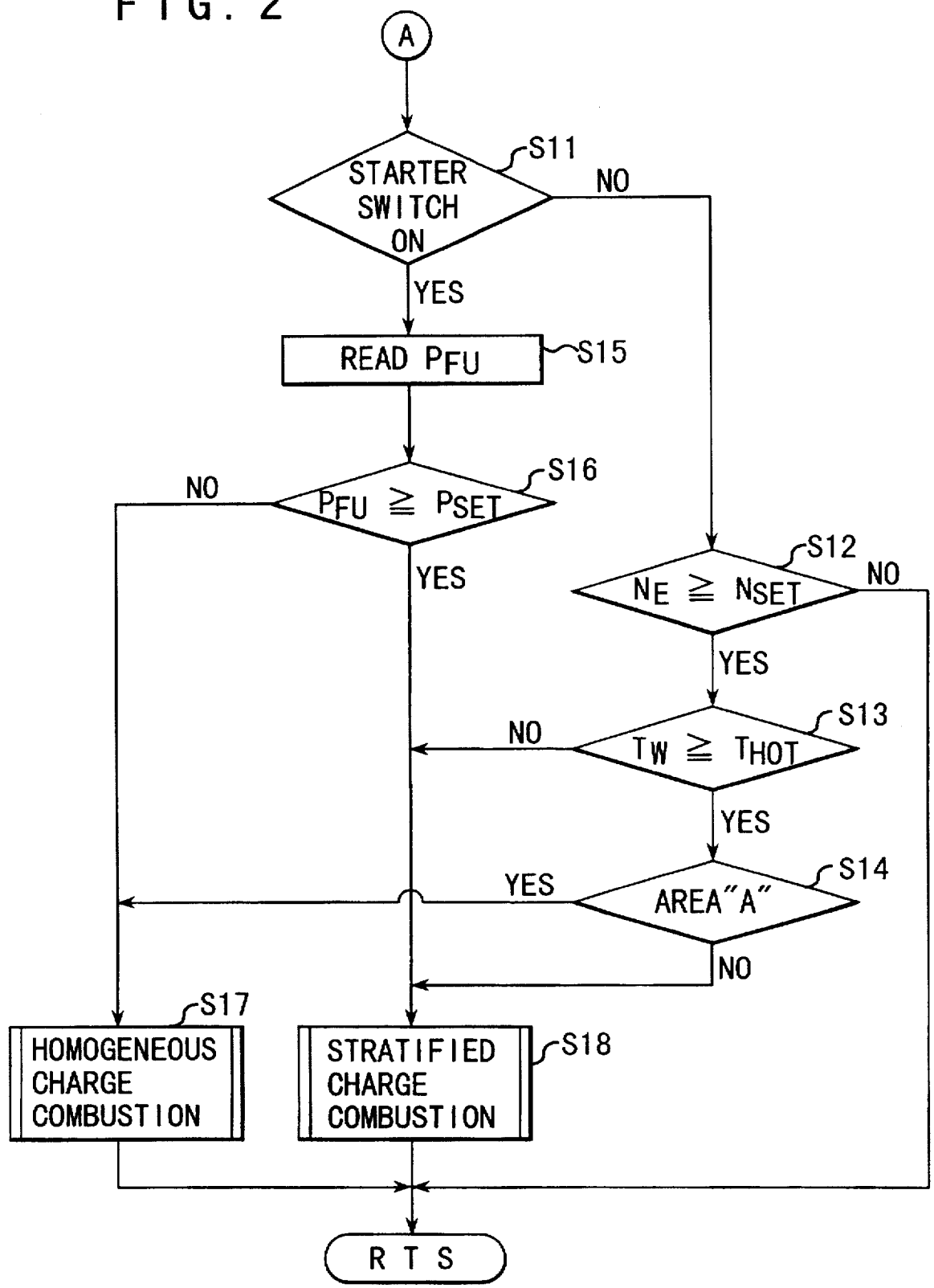
FIG. 2 is a flowchart continued from that shown in FIG. 1.

Next, a routine for establishing the combustion strategy which is executed in the electronic control unit 11 will be described with reference to flowcharts shown in FIG. 1 and FIG. 2.

When an ignition switch is turned on, the electronic control apparatus 11 is energized and the program is initialized. At this moment, a combustion strategy judging flag Flag 1 is established to be 0 (Flag←0) so as to start the routine for establishing the combustion strategy. First, at a step S1 a coolant temperature $T_W$ and an engine speed $N_E$ are read from the coolant temperature sensor 12 and the crank angle sensor 15, respectively and at a next step S2 it is judged whether or not the coolant temperature $T_W$ exceeds a cold state judging temperature $T_{SET}$ (for example 60° C.) established beforehand. This cold state judging temperature $T_{SET}$ is established to be a lower value than a warm-up completion judging temperature $T_{HOT}$ (for example, 80° C.).

If $T_W < T_{SET}$, judging that the engine is in the cold state, the program goes from S2 to S3 where it is judged whether or not the engine speed $N_E$ is equal to or larger than a firing completion judging engine speed $N_{SET}$. Immediately after the ignition switch is turned on, since the engine is in standstill, $N_E$ is smaller than $N_{SET}$ ($N_E < N_{SET}$) and the program steps to S4 wherein it is judged whether or not the starter switch 18 is turned on. In this case, since the starter switch 18 is in an OFF condition immediately after the ignition switch is turned on, the routine returns to START.

When a driver continues to turn the ignition switch and then the starter switch 18 is turned on, the program goes from S4 to S5 where the combustion strategy is set to the homogeneous charge combustion mode. At S5, the fuel injection timing and the pulse width of fuel injection are established based on the engine operating condition. After that, the program goes to S6 in which the combustion strategy judging flag Flag 1 is established to be 1 (Flag 1←1) and the program returns to START.

At the start of the engine, a fixed ignition timing is introduced. As shown in FIG. 5, when the crank pulse for the firing cylinder immediately before top dead center of the compression stroke is inputted, the ignition signal is outputted to the spark plug. On the other hand, fuel is injected to the firing cylinder at the intake stroke when a first crank pulse at the intake stroke is inputted. Since fuel is injected to the cylinder at the intake stroke, fuel is mixed well with air until the ignition timing comes and consequently the engine can be started easily even when it is cold.

Once the firing is completed and the engine speed $N_E$ exceeds the firing completion judging engine speed $N_{SET}$ ($N_E \geq N_{SET}$), the program skips from S3 to S5 where the combustion strategy is set to the homogeneous charge combustion mode. Therefore, the engine continues to be operated under the homogeneous charge combustion mode during the warm-up period.

Then, when the coolant temperature $T_W$ goes up and exceeds the cold state judging temperature $T_{SET}$, the program is diverted from S2 to S7, the combustion strategy judging flag Flag 1 is referred. Since the Flag 1 is set to 1, the program goes to S8 where the present engine operating condition is investigated by referring to a map on the basis of the engine load and engine speed.

Figure 4:
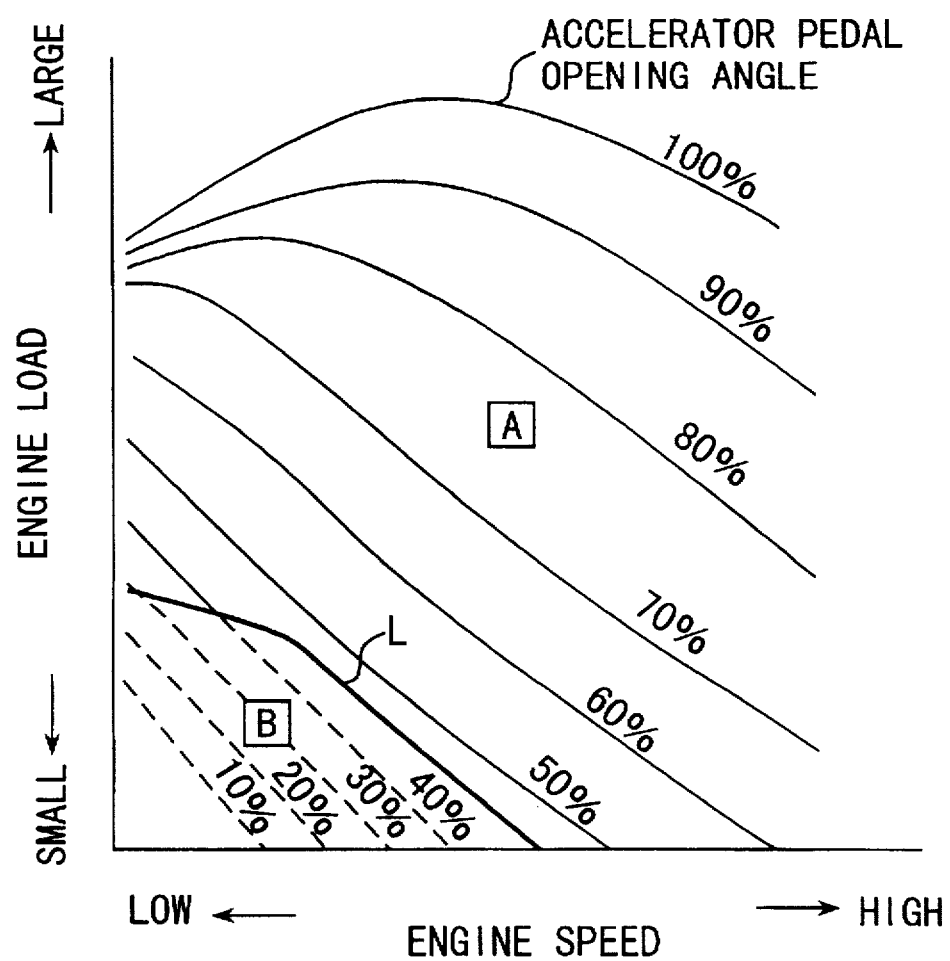
FIG. 4 is a schematic view of a map for determining a combustion strategy.

The map, as shown in FIG. 4, is a map parameterizing the engine load and the engine speed $N_E$, whose mapping area is divided into two areas, an area A where the homogeneous charge combustion mode is selected and an area B where the stratified charge combustion mode is selected. These two areas are separated by a combustion switching line L. This combustion switching line L is a line experimentally drawn by combining points where a smooth transference from the homogeneous charge combustion to the stratified charge combustion is obtained. In this embodiment, the engine load is represented by a basic fuel injection pulse width $T_p$ which is obtained from the intake air amount and the engine speed.

The area A of the map is an area covering from intermediate load to high load or an area covering from intermediate speed to high speed. When the engine is operated in the area A, the homogeneous charge combustion mode is always selected for the combustion strategy. On the other hand, the area B of the map is an area covering the low load and low speed. When the engine is operated in the area B under the warm-up condition ($T_W < T_{HOT}$), the homogeneous charge combustion mode is selected. On the other hand, when the engine is operated in the area B after the warm-up is completed ($T_W \geq T_{HOT}$), the stratified charge combustion is selected. However, when the engine is operated under the warm-up condition and the coolant temperature is above the cold state judging temperature $T_{SET}$ and when it is judged that the engine operating condition crosses the combustion switching line L from the area A to the area B, the stratified charge combustion mode is selected.

That is to say, for example, when the engine load goes down across the combustion switching line L with the accelerator pedal opening angle held at 40% as shown in FIG. 4, if the coolant temperature $T_W$ is above the cold state judging temperature $T_{SET}$, the combustion strategy is switched from the homogeneous charge combustion mode to the stratified charge combustion mode.

If it is judged at S8 that the engine operating condition does not cross the combustion switching line L from the area A to the area B, i.e., the engine operating condition stays in the area A or the area B, or in case where the engine operating condition moves from the area B to the area A and this condition is maintained as it is, the program goes to S5 where the homogeneous charge combustion is continued.

On the other hand, when the engine operating condition moves across the combustion switching line L from the area A to the area B (assuming that at first the engine is located in the area A), the program goes to S9 where the combustion strategy is established to be a stratified charge combustion mode and at the same time the ignition timing, the fuel injection timing, the fuel injection amount and the like are determined respectively in accordance with the engine operating condition. After these determined values are set to the ignition timing timer, the fuel injection timing timer, the injection pulse width timer and the like, the program steps to S10 in which the combustion strategy judging flag Flag 1 is cleared (Flag 1 ←0) and then the program returns to START.

Thus, since the combustion strategy can be shifted on the combustion switching line L from the homogeneous charge combustion mode to the stratified charge combustion mode when the engine load moves from the high load area to the low load area, or from the intermediate load area to the low load area, the combustion strategy can be changed without an abrupt change of the volumetric efficiency of the engine, this leads to an alleviated change of the engine load during running.

When the combustion strategy is set to the stratified charge combustion mode, the fuel injection timing is established at the latter stage of the compression stroke. On the other hand, the ignition timing is established before dead center (BTDC). Fuel injection must be finished immediately before ignition. Further, ignitable mixture gas must be formed around the electrodes of the spark plug. To determine the fuel injection timing, all of these must be taken into consideration. The fuel injection timing timer starts when a specified crank pulse, for example, a first crank pulse at the compression stroke is inputted.

When the combustion mode is switched from the homogeneous charge combustion to the stratified charge combustion during the warming-up period of the engine, at S10 the combustion strategy judging flag Flag 1 is cleared.

Therefore, with respect to the routine thereafter, the program is diverted from S7 to S11. As illustrated in FIG. 2, at S11 it is judged whether or not the starter switch 18 is turned on. In this case, since the starter switch is turned off (the engine is already started), the program skips to S12 where it is judged whether or not the engine speed $N_E$ is equal to or larger than the firing completion judging engine speed $N_{SET}$. In this case, since the engine speed $N_E$ exceeds the firing completion judging engine speed $N_{SET}$, the program goes to S13, wherein it is checked whether or not the coolant temperature $T_W$ is equal to or larger than the warm-up completion judging temperature $T_{HOT}$. In this case, since the engine is during warming-up ($T_{SET} \leq T_W < T_{HOT}$), the program skips to S18 where the stratified charge combustion is continued.

On the other hand, when it is judged at S13 that the warming-up has been completed ($T_W \geq T_{HOT}$), the program goes to S14 where it is judged whether the present engine operating area is located in the area A or the area B by referring to the map. If it is in the area A, the program skips to S17 where the homogeneous charge combustion mode is selected and if in the area B, the program goes to S18 where the stratified charge combustion mode is selected.

Further, at the hot start, or when the coolant temperature $T_W$ is yet high and still above the cold state judging temperature $T_{SET}$, the program steps from S2 to S7 where the value of the combustion strategy judging flag Flag 1 is referred. Since the initial value of the Flag 1 is 0, the program skips to S11 where it is judged whether or not the starter switch 18 is turned on. Since the starter switch 18 is still in the OFF condition immediately after the ignition switch is turned on, the program steps to S12 in which it is judged whether or not the engine speed $N_E$ is equal to or larger than the firing completion judging engine speed $N_{SET}$. In this case, the engine is in standstill and the program returns to START.

Then, when the starter switch 18 is turned on, the program goes to S15 where a fuel pressure $P_{FU}$ which is applied to the fuel injector 6 is read. At S16, it is checked whether or not the fuel pressure $P_{FU}$ is equal to or larger than an injectable fuel pressure $P_{SET}$. If $P_{FU} < P_{SET}$, that is, if it is judged that the fuel pressure $P_{FU}$ is too low for the droplets of injected fuel to be atomized, the program goes to S17 where the homogeneous charge combustion mode is selected. On the other hand, if $P_{FU} \geq P_{SET}$, that is, if it is judged that the fuel pressure $P_{FU}$ is high enough for the droplets of injected fuel to be atomized, the program steps to S18 where the stratified charge combustion mode is selected.

Then, when the engine starts and the starter switch 18 is turned off, the program steps from S11 to S12 where it is judged whether or not the engine speed $N_E$ is equal to or larger than the firing completion judging engine speed $N_{SET}$.

If $N_E < N_{SET}$, the program returns to START while the combustion strategy being retained as established before. If $N_E \geq N_{SET}$, the program goes to S13 where it is judged whether or not the coolant temperature $T_W$ is equal to or larger than the warm-up completion judging temperature $T_{HOT}$. If $T_W < T_{HOT}$, namely, if the engine has not yet completed warming-up, the program skips to S18 where the stratified charge combustion mode is continued. If $T_W \geq T_{HOT}$, namely, if the engine has completed warming-up, the program goes to S14 where it is judged whether the engine operating condition is located in the area A or in the area B by referring to the map parameterizing the engine load and the engine speed $N_E$. If in the area A, the program skips to S17 at which the combustion strategy is set to the homogeneous charge combustion mode and if in the area B, the program goes to S18 at which the combustion strategy is set to the stratified charge combustion mode.

Thus, according to the embodiment of the present invention, since the combustion strategy at the cold start is set to the homogeneous charge combustion mode, the warm-up period can be shortened and the spark plug can be prevented from being fouled due to wet electrodes, compared to the case where the stratified charge combustion is applied at the cold start. Further, since the combustion strategy can be switched from the homogeneous charge combustion to the stratified charge combustion even during warming-up, not only the fuel economy performance can be improved but also exhaust emissions can be reduced.

Further, according to the present invention, since the switching from the homogeneous charge combustion to the stratified charge combustion is performed smoothly, driveability of the vehicle during warming-up can be enhanced.

Further, from the view point of the complexity of the overall system, two combustion strategies, stratified and homogeneous can be accomplished with a single fuel injection system (one fuel injector per cylinder and one fuel line) and this leads to a large reduction of manufacturing cost.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A combustion control system for an automobile in-cylinder fuel injection engine having a combustion chamber formed by a cylinder, a piston and a cylinder head, an engine temperature sensor for detecting an engine temperature, a fuel injector provided in said cylinder head for directly injecting fuel from an injection nozzle thereof into said combustion chamber and a spark plug provided in said cylinder head with an electrode thereof located near said injection nozzle, said combustion control system capable of switching a combustion strategy from a homogeneous charge combustion mode where a homogeneous charge combustion is performed to a stratified charge combustion mode where a stratified charge combustion is performed and vice versa according to an engine operating condition, comprising:

stratified combustion area establishing means for establishing a stratified combustion area where said stratified charge combustion is performed in an overall engine operating area of said engine;

homogeneous charge combustion establishing means for establishing said combustion strategy at starting said engine to be said homogeneous charge combustion mode when said engine temperature is lower than a predetermined temperature and for holding said homogeneous charge combustion mode until said engine operating condition returns to said stratified combustion area again; and stratified charge combustion establishing means for establishing said combustion strategy during engine warm-up to be said stratified charge combustion mode when said engine temperature is equal to or larger than said predetermined temperature and at least when said engine operating condition returns to said stratified combustion area and for establishing said combustion strategy after warming-up to be said stratified charge combustion mode when said engine operating condition stays in said stratified combustion area.

2. A combustion control system for an automobile in-cylinder fuel injection engine having a combustion chamber formed by a cylinder, a piston and a cylinder head, an engine temperature sensor for detecting an engine temperature, a fuel injector provided in said cylinder head for directly injecting fuel from an injection nozzle thereof into said combustion chamber and a spark plug provided in said cylinder head with an electrode thereof located near said injection nozzle, a fuel pressure sensor for detecting a fuel pressure applied to said fuel injector, said combustion control system capable of switching a combustion strategy from a homogeneous charge combustion mode where a homogeneous charge combustion is performed to a stratified charge combustion mode where a stratified charge combustion is performed and vice versa according to an engine operating condition, comprising:

stratified charge combustion establishing means for establishing said combustion strategy at starting said engine to be said stratified charge combustion mode when said engine temperature is equal to or larger than a predetermined temperature and when said fuel pressure applied to said fuel injector is equal to or larger than a predetermined value; and combustion strategy establishing means for establishing said combustion strategy after starting said engine based on said engine operating condition.

3. A combustion control system for an automobile in-cylinder fuel injection engine having a combustion chamber formed by a cylinder, a piston and a cylinder head, an engine temperature sensor for detecting an engine temperature, a fuel injector provided in said cylinder head for directly injecting fuel from an injection nozzle thereof into said combustion chamber and a spark plug provided in said cylinder head with an electrode thereof located near said injection nozzle, a fuel pressure sensor for detecting a fuel pressure applied to said fuel injector, said combustion control system capable of switching a combustion strategy from a homogeneous charge combustion mode where a homogeneous charge combustion is performed to a stratified charge combustion mode where a stratified charge combustion is performed and vice versa according to an engine operating condition, comprising:

homogeneous charge combustion establishing means for establishing said combustion strategy at starting said engine to be said homogeneous charge combustion mode when said engine temperature at starting said engine is equal to or larger than a predetermined temperature and when said fuel pressure applied to said fuel injector is smaller than a predetermined value; and combustion strategy establishing means for establishing said combustion strategy after starting said engine based on said engine operating condition.

4. The combustion control system according to claim 2, wherein said engine operating condition of said engine is obtained from a map parameterizing an engine load and an engine speed.

5. The combustion control system according to claim 3, wherein said engine operating condition of said engine is obtained from a map parameterizing an engine load and an engine speed.

6. A combustion control method of an automobile in-cylinder fuel injection engine having a combustion chamber formed by a cylinder, a piston and a cylinder head, an engine temperature sensor for detecting an engine temperature, a fuel injector provided in said cylinder head for directly injecting fuel from an injection nozzle thereof into said combustion chamber and a spark plug provided in said cylinder head with an electrode thereof located near said injection nozzle, said combustion control system capable of switching a combustion strategy from a homogeneous charge combustion mode where a homogeneous charge combustion is performed to a stratified charge combustion mode where a stratified charge combustion is performed and vice versa according to an engine operating condition, comprising the steps of:

establishing a stratified combustion area where said stratified charge combustion is performed in an overall engine operating area of said engine;

establishing said combustion strategy at starting said engine to be said homogeneous charge combustion mode when said engine temperature is lower than a predetermined temperature and holding said homogeneous charge combustion mode until said engine operating condition returns to said stratified combustion area again; and establishing said combustion strategy during engine warm-up to be said stratified charge combustion mode when said engine temperature is equal to or larger than said predetermined temperature and at least when said engine operating condition returns to said stratified combustion area and establishing said combustion strategy after warming-up to be said stratified charge combustion mode when said engine operating condition stays in said stratified combustion area.

* * * * *